US008175648B2

(12) United States Patent
Johnson et al.

(10) Patent No.: US 8,175,648 B2
(45) Date of Patent: May 8, 2012

(54) SUPER ECONOMICAL BROADCAST SYSTEM AND METHOD

(75) Inventors: Torbjorn Johnson, Vaxholm (SE); John Schadler, Raymond, ME (US)

(73) Assignees: SPX Corporation, Charlotte, NC (US); Radio Innovation Sweden AB, Kista (SE)

( * ) Notice: Subject to any disclaimer, the term of this patent is extended or adjusted under 35 U.S.C. 154(b) by 434 days.

(21) Appl. No.: 12/435,036

(22) Filed: May 4, 2009

(65) Prior Publication Data

US 2009/0305710 A1 Dec. 10, 2009

Related U.S. Application Data

(60) Provisional application No. 61/049,950, filed on May 2, 2008.

(51) Int. Cl.
*H04M 1/00* (2006.01)
(52) U.S. Cl. .................................... 455/562.1; 455/67.3
(58) Field of Classification Search ............... 455/562.1, 455/423, 448, 447, 67.3; 370/336, 339
See application file for complete search history.

(56) References Cited

U.S. PATENT DOCUMENTS

| | | | | |
|---|---|---|---|---|
| 5,440,318 | A | 8/1995 | Butland et al. | |
| 5,835,062 | A | 11/1998 | Heckaman et al. | |
| 5,914,946 | A * | 6/1999 | Avidor et al. | 370/336 |
| 6,034,649 | A | 3/2000 | Wilson et al. | |
| 6,072,439 | A | 6/2000 | Ippolito et al. | |
| 6,088,002 | A | 7/2000 | Johnson et al. | |
| 6,094,166 | A | 7/2000 | Martek et al. | |
| 6,351,247 | B1 | 2/2002 | Linstrom et al. | |
| 6,456,241 | B1 | 9/2002 | Rothe et al. | |
| 6,480,167 | B2 | 11/2002 | Matthews | |
| 6,924,776 | B2 | 8/2005 | Le et al. | |
| 7,061,441 | B2 | 6/2006 | Schadler | |
| 7,173,572 | B2 | 2/2007 | Teillet et al. | |
| 2002/0068612 | A1 | 6/2002 | Carey et al. | |
| 2003/0162566 | A1 | 8/2003 | Shapira et al. | |
| 2004/0196834 | A1 | 10/2004 | Ofek et al. | |
| 2007/0026900 | A1 | 2/2007 | Smith | |
| 2007/0270155 | A1 * | 11/2007 | Nelson et al. | 455/452.2 |

* cited by examiner

*Primary Examiner* — Joseph Lauture
(74) *Attorney, Agent, or Firm* — Baker & Hostetler LLP

(57) ABSTRACT

A super economical broadcast system and method are provided. The system includes a plurality of base transceiver stations that define a plurality of respective cells, each base transceiver station includes a phased-array antenna having a plurality of sectors, each sector has a plurality of vertically-arranged antenna panels, and each antenna panel has a plurality of vertically-arranged radiators disposed in at least two staggered columns. The method includes forming a horizontally and vertically shaped beam using a plurality of vertically-arranged antenna panels, in which each antenna panel has a plurality of vertically-arranged radiators disposed in at least two staggered columns, and transmitting a power distribution that has an essentially uniform field strength over a near zone, a middle zone and at least a portion of a far zone.

20 Claims, 14 Drawing Sheets

SUPER ECONOMICAL BROADCAST SYSTEM AND METHOD

CROSS-REFERENCE TO RELATED APPLICATIONS

This application claims priority to U.S. Provisional Patent Application Ser. No. 61/049,950 (filed on May 2, 2008), the contents of which is incorporated herein by reference in its entirety.

FIELD OF THE INVENTION

The present invention relates, generally, to cellular communication systems. In particular, the present invention is related to a super economical broadcast system and method.

BACKGROUND OF THE INVENTION

Cellular radiotelephone system base transceiver stations (BTSs), at least for some United States (U.S.) and European Union (EU) applications, may be constrained to a maximum allowable effective isotropically radiated power (EIRP) of 1640 watts. EIRP, as a measure of system performance, is a function at least of transmitter power and antenna gain. As a consequence of restrictions on cellular BTS EIRP, U.S., EU, and other cellular system designers employ large numbers of BTSs in order to provide adequate quality of service to their customers. Further limitations on cells include the number of customers to be served within a cell, which can make cell size a function of population density.

One known antenna installation has an antenna gain of 17.5 dBi, a feeder line loss of 3 dB (1.25" line, 200 ft mast) and a BTS noise factor of 3.5 dB, such that the Ga-NFsys=17.5−3.5−3.0=11 dBi (in uplink). Downlink transmitter power is typically 50 W. With feeder lines, duplex filter and jumper cables totaling −3.5 dB, the Pa input power to antenna is typically 16 W, such that the EIRP is 16 W+17.5 dB=1,000 W.

In many implementations, each BTS is disposed near the center of a cell, variously referred to in the art by terms such as macrocell, in view of the use of still smaller cells (microcells, nanocells, picocells, etc.) for specialized purposes such as in-building or in-aircraft services. Typical cells, such as those for city population density, have radii of less than 3 miles (5 kilometers). In addition to EIRP constraints, BTS antenna tower height is typically governed by various local or regional zoning restrictions. Consequently, cellular communication providers in many parts of the world implement very similar systems.

Restrictions on cellular BTS EIRP and antenna tower height vary within each countries. Not only is the global demand for mobile cellular communications growing at a fast pace, but there are literally billions of people, in technologically-developing countries such as India, China, etc., that currently do not have access to cellular services despite their willingness and ability to pay for good and inexpensive service. In some countries, government subsidies are currently facilitating buildout, but minimization of the cost and time for such subsidized buildout is nonetheless desirable. In these situations, the problem that has yet to be solved by conventional cellular network operators is how to decrease capital costs associated with cellular infrastructure deployment, while at the same time lowering operational expenses, particularly for regions with low income levels and/or low population densities. An innovative solution which significantly reduces the number of conventional BTS site-equivalents, while reducing operating expenses, is needed.

BRIEF SUMMARY OF THE INVENTION

Embodiments of the present invention provide a super economical broadcast system and method.

In one embodiment, a cellular communications system includes a plurality of base transceiver stations that define a plurality of respective cells, each base transceiver station includes a phased-array antenna having a plurality of sectors, each sector has a plurality of vertically-arranged antenna panels, and each antenna panel has a plurality of vertically-arranged radiators disposed in at least two staggered columns.

In another embodiment, a method for broadcasting signals using a phased-array antenna includes forming a horizontally and vertically shaped beam using a plurality of vertically-arranged antenna panels, in which each antenna panel has a plurality of vertically-arranged radiators disposed in at least two staggered columns, and transmitting a power distribution that has an essentially uniform field strength over a near zone, a middle zone and at least a portion of a far zone.

There have thus been outlined, rather broadly, certain embodiments of the invention, in order that the detailed description thereof herein may be better understood, and in order that the present contribution to the art may be better appreciated. There are, of course, additional embodiments of the invention that will be described below, and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION OF THE INVENTION

Figure 1:
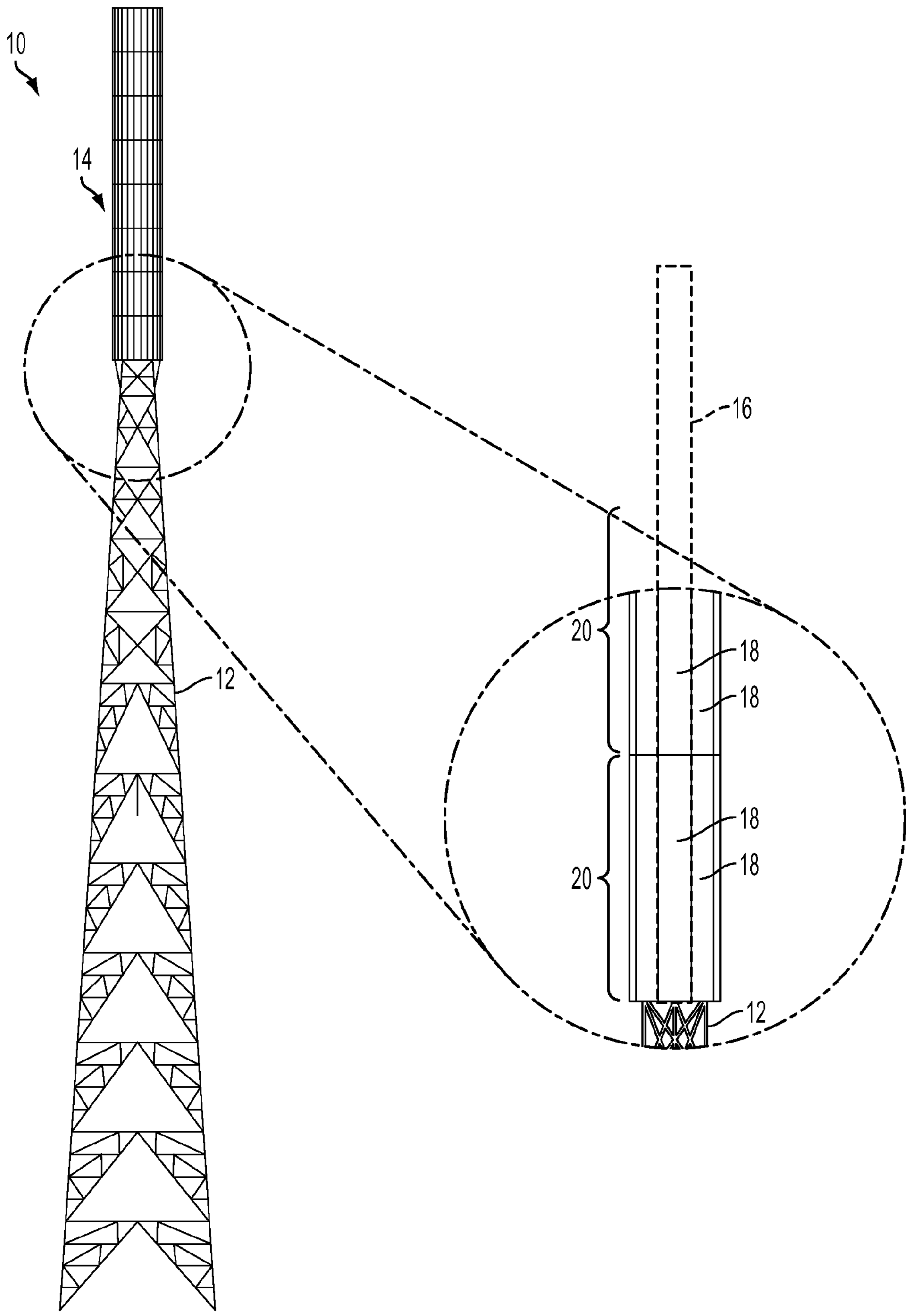
FIG. 1 depicts a perspective view of a base transceiver station antenna, in accordance with an embodiment of the present invention.

Embodiments of the present invention provide a super economical broadcast system and method.

I. Overview of the Invention

The inventive super economical broadcast system encompasses various antenna design and radio network planning concepts that solve the needs of cellular operators in GSM-960/1800/1900, CDMA-450/850 and UMTS-2170 standards with full support for all sub-standards and modulations in the 380 to 3,800 MHz frequency range. Advantageously, the inventive super economical broadcast system reduces specific capital expenditures and operational expenses, i.e., e.g., due to 10-30 times increase of a site's coverage area and application of optimized radio coverage planning methods, while exceeding standard technologies in terms of technical efficiency, applicability and profitability levels.

In accordance with various embodiments of the present invention, the number of required BTSs is decreased 10-20 times, maintaining or increasing quality of service, and allowing removing all redundant BTSs for use in new network construction or expansion of existing networks. This improved efficiency of resource management allows an operator to delay or even stop purchases of new equipment (BTS, transceivers), leading to economy of financial resources, higher profitability and increased business capitalization. Modernization of cells, in accordance with the teachings of the present invention, leads to better fault-tolerance of radio access networks due to implementation of modern and more reliable equipment. Maintenance expenses are also reduced, mean time between failures (MTBF) is significantly increased and total cost of ownership (TCO) of a cellular network is greatly reduced, keeping or even increasing profitability levels.

A preferred embodiment of the inventive super economical broadcast system includes, inter alia, installation of optimized sites with a maximal possible site capacity of 432 Erlang and a super long range, i.e., e.g., up to 40 km for indoor coverage. Anticipated costs per 1 $km^2$ of network are more than ten times lower than costs of coverage created with cheaper and less qualitative BTSs and standard antennas. These optimized sites amplify signals both in their uplink and downlink channels, improving link budgets by 18-30 dB in comparison with standard antennas and masts, even for 10-20 times larger coverage areas. Amplification in downlink can reach as much as 80 W per carrier, allowing mobile terminals to reduce energy consumption and minimize RF interference.

These optimized sites are also characterized by maximal flexibility of capacity expansion, i.e., e.g., from an initial configuration of 7.5-15 Erlang to 432 Erlang (+2,880%) in mature networks. This ensures maximal adaptive capabilities for the network in contrasting demographic, economic and strategic conditions of modern telecommunication markets.

The inventive super economical broadcast system is similarly applicable to broadcasting networks, where powerful amplifiers and high-mounted antennas provide line-of-sight radio coverage on a territory within a radius of 40-50 km (5,000 to 8,000 $km^2$).

The inventive super economical broadcast system advantageously allows an operator to quickly launch voice services with minimal capital expenditures on vast geographical areas, giving millions of people an opportunity to improve quality of their lives. This way, an operator receives economical and profitable technologies that may become key elements of business development strategies for many years to come. By adapting the teachings of the present invention, operators can tap into self-financing opportunities that may be supported by high, internal rates-of-return. An operator may well need only 15-25% of the total amount of capital expenditures to start a project self-financing process—the rest may be financed by large, generated gross profits.

The inventive super economical broadcast system may be most profitable in regions with relatively low spending levels on telecommunication services (ARPU US$1-4), with absent or old analogue telecommunication infrastructures. In such regions, a mobile cellular infrastructure with the lowest CAPEX levels (50-150 US$/$km^2$) may provide the best economic and technical benefits. Flexibility in increasing a cell's capacity, operating expenses reduced by 50-95%, compatibility with all new standards (GPRS, EVDO, HSDPA, WiMAX, UMB, OFDM/MIMO) may jointly ensure that the lowest total cost of ownership and enable expansion into markets with low income and/or low population densities.

II. Detailed Description of Several Embodiments of the Invention

According to one aspect of the present invention, cell spacing, i.e., the distance between adjacent BTSs, is advantageously increased relative to conventional cellular systems while providing a consistent quality of service (QoS) within each cell. Preferred embodiments of the present invention increase the range of each BTS. Conventional macrocells typically range from about ¼ mile (400 meters) to a theoretical maximum of 22 miles (35 kilometers) in radius (the limit under the GSM standard); in practice, radii on the order of 3 to 6 ml (5-10 km) are employed except in high-density urban areas and very open rural areas. The present invention provides full functionality at the GSM limit of 22 ml, for typical embodiments of the invention, and extends well beyond this in some embodiments. Cell size remains limited by user capacity, which can itself be significantly increased over that of conventional macrocells in some embodiments of the present invention.

Commensurate with the increase in cell size, the BTS antenna tower height is increased, retaining required line-of-sight (for the customary ⁴⁄₃ diameter earth model) propagation paths for the enlarged cell. Preferred embodiments of the present invention increase the height of the BTS antenna tower from about 200 feet (60 meters) anywhere up to about 1,500 ft (about 500 m). In order for the transmit power and receive sensitivity of a conventional cellular transceiver (user's hand-held mobile phone, data terminal, computer adapter, etc.) to remain largely unchanged, both the EIRP and receive sensitivity of the tower-top apparatus for the SEC system are increased at long distances relative to conventional cellular systems and reduced near the mast. These effects are achieved by the phased-array antenna and associated passive components, as well as active electronics included in the present invention.

Standard BTS equipment, such as transceivers, electric power supplies, data transmission systems, temperature control and monitoring systems, etc., may be advantageously used within the SEC system. Generally, from one to three or more cellular operators (service providers) may be supported simultaneously at each BTS, featuring, for example, 36 to 96 transceivers and 216 to 576 Erlang of capacity. Alternatively, more economical BTS transmitters (e.g., 0.1 W transmitter power) may be used by the cellular operators, further reducing cost and energy consumption. These economical BTSs have a smaller footprint and lower energy consumption than previous designs, due in part to performance of transmitted signal amplification and received signal processing at the top of the phased-array antenna tower rather than on the ground.

FIG. 1 presents a perspective view of a BTS antenna, in accordance with an embodiment of the present invention.

The base transceiver station 10 includes an antenna tower 12 and a phased-array antenna 14, with the latter disposed on an upper portion of the tower 12, shown here as the tower top. The antenna 14 in the embodiment shown is generally cylindrical in shape, which serves to reduce windload, and has a number of sectors 16, such as, for example, 6 sectors, 8 sectors, 12 sectors, 18 sectors, 24 sectors, 30 sectors, 36 sectors, etc., that collectively provide omnidirectional coverage for a cell associated with the BTS. Each sector 16 includes a number of antenna panels 18 in a vertical stack. Each elevation 20 includes a number of antenna panels 18 that can surround a support system to provide 360° coverage at a particular height, with each panel 18 potentially belonging to a different sector 16. Each antenna panel 18 includes a plurality of vertically-arrayed radiators, which are enclosed within radomes that coincide in extent with the panels 18 in the embodiment shown.

Feed lines, such as coaxial cable, fiber optic cable, etc., connect cellular operator equipment to the antenna feed system located behind the respective sectors 16. At the input to the feed system for each sector 16 are diplexers, power transmission amplifiers, low-noise receive amplifiers, etc., to amplify and shape the signals transmitted from, and received by, the phased-array antenna 14. In one embodiment, the feed system includes rigid power dividers to interconnect the antenna panels 18 within each sector 16, and to provide vertical lobe shaping and beam tilt to the panels 18 in that sector. In another embodiment, flexible coaxial cables may be used within the feed system.

Figure 2:
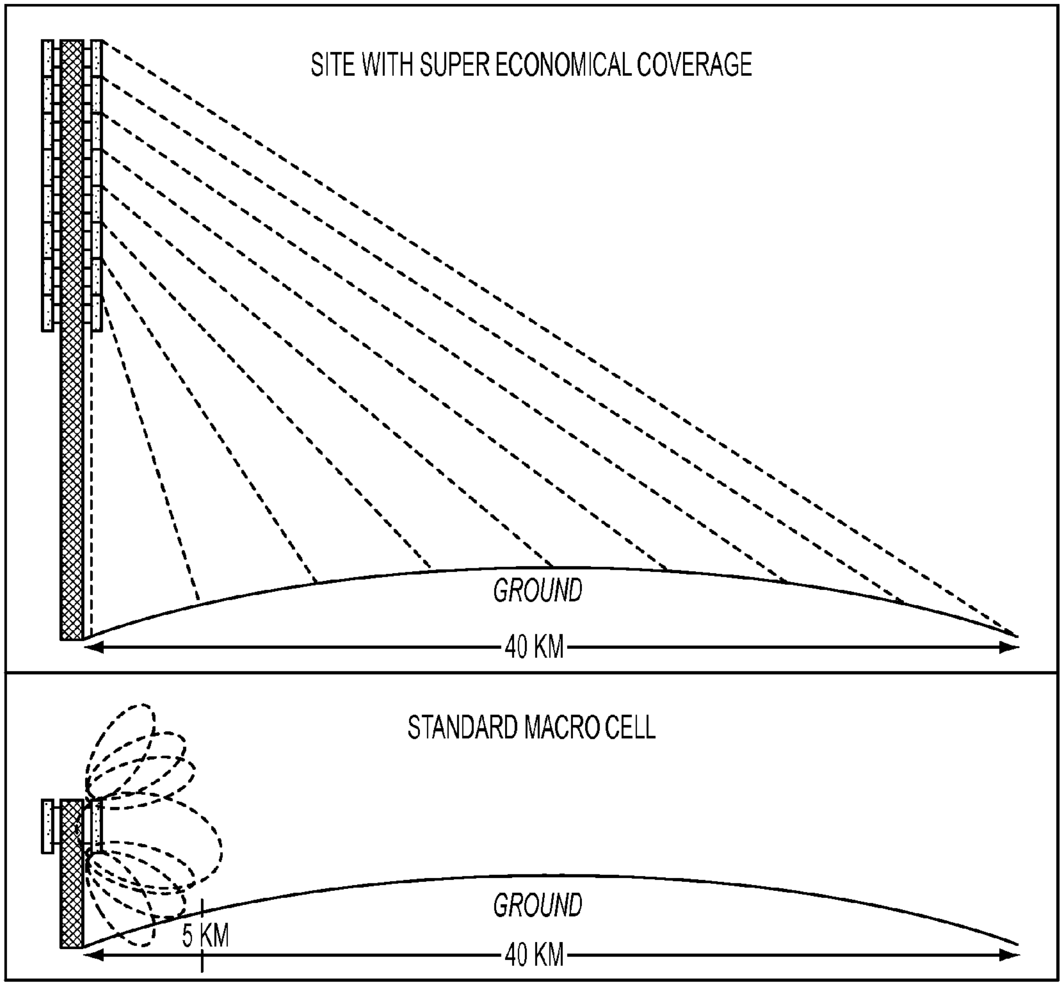
FIG. 2 compares standard cell coverage with coverage provided by a base transceiver station antenna in accordance with an embodiment of the present invention.

FIG. 2 compares standard cell coverage with coverage provided by a BTS antenna according to an embodiment of the present invention. Table 1 compares antenna parameters and coverage for a conventional cellular site to two different embodiments of the present invention. The GSM 870-960 MHz band is used for this comparison.

TABLE 1

| | Standard Site | 1st Embodiment | 2nd Embodiment |
|---|---|---|---|
| Antenna Parameters | | | |
| Sectors @ Beam Width | 3 @ 65° | 6 @ 45° | 9 @ 30° |
| Elevations | 1 | 8 | 12 |
| Panels | 3 | 48 | 108 |
| Antenna Aperture | 2.5 m | 20 m | 30 m |
| Installation Height | 48 m | 126 m | 247 m |
| Antenna Gain | 17.5 dBi | 28.0 dBi | 31.0 dBi |
| Uplink PL Efficiency | +0.0 dB | +26.6 dB | +36.4 dB |
| Signal Gain Factor | 1 | 457 | 4365 |
| Coverage | | | |
| Cell Radius | 5 km | 23 km | 41 km |
| Indoor Coverage Area | 80 $km^2$ | 1710 $km^2$ | 5280 $km^2$ |
| Coverage Area Factor | 1.0 | 21.4 | 66.1 |
| Okumura-Hata exp. | 4.0 | 4.0 | 4.0 |

Generally, antenna tower 12 is a guyed or self supporting antenna mast that supports approximately 3,000 to 20,000 lbs of payload, has a total mast height from about 200 feet to about 1,500 feet, and is capable of supporting the SEC antenna with high wind load resistance. Alternatively, standard antenna masts, chimneys, towers or other constructions may be used, provided the desired structural rigidity and payload ratings are satisfied. A solar power collector, microwave link, wind generator, etc. may be provided to reduce power and landline communication infrastructure burdens for the BTS.

In some embodiments, phased-array antennas 14 use between 24 and 288 antenna panels 18, arranged into three to thirty-six sectors 16, each of which includes two to sixteen, preferably eight to twelve, elevations 20 of antenna panels 18. Generally, each sector 16 forms a directional antenna beam that has a bandwidth on the order of 10%, a horizontal beam width of 7° to 65° (preferably 30° or 45° in twelve-sector or eight-sector embodiments), and a vertical beam width of 0.66° to 2°. For preferred embodiments, vertical arrangement of eight elevations 20 of antenna panels 18 improves antenna aperture efficiency for both signal transmission and reception. Compact circumferential arrangement of sectors 16 establishes a cylindrical shape. Some antenna 14 embodiments may be adaptable to support capacity increases to meet traffic and growth demands.

Frequency assignments other than 870-960 MHz are equally feasible, specifically to include at least previously-allocated bands in the vicinity of 460 MHz, 750 MHz, 900 MHz, 2 GHz, 2.8 GHz, and 3.5 GHz. Such bands, as well as others that may be assigned or acquired subsequently, may each require apparatus differing appreciably in size and somewhat in configuration in order to provide the service described herein. For example, since radiative devices are often effective over about a 10% range (i.e., +/−5% of a center frequency), and may be defined in terms of dimensions, it may be necessary to roughly double the physical size of individual radiators and the spacing therebetween to service the 460 MHz band, and to halve these dimensions for the 2 GHz band, compared to the 900 MHz band described above.

In other embodiments contemplated for the invention, wider bandwidth radiators may support at least all of the U.S. and EU GSM and/or CDMA band, for example, and the associated filters may be capable of accommodating multiple such bands through retuning rather than manufacturing alternate devices that differ in physical dimensions. Because the relevant U.S. and EU bands do not overlap, the transmit and receive frequencies for the respective bands are closer to each other than are the respective transmit and receive frequencies of the bands, so that filters for the bands preferably operate in discrete ranges. This may be of consideration should multiple, closely-spaced bands be licensed, for example, in which case multiple filters may support fewer arrays of radiators.

In one embodiment, each antenna panel 18 is made using, as a frame and reflector, a single aluminum extrusion that measures about 8 feet×12 inches×8 inches (2.5 m×5 cm×20 cm) and weighs roughly 30 pounds (15 kg). To this extrusion are attached radiators, signal distribution fittings, a radome, mounting hardware, etc. The antenna panels 18 are installed within each sector 16 of the phased-array antenna 14 with very high coplanarity (e.g., +/−0.25°), provided in part by structural optimization of all antenna and mast elements. Additionally, these antenna panels reduce effective wind load areas. Advantageously, these features combine to increase uplink channel sensitivity (antenna gain) while improving downlink channel throughput. Other sector 16 configurations and antenna panel 18 dimensions are also contemplated by the present invention.

Figure 3A:
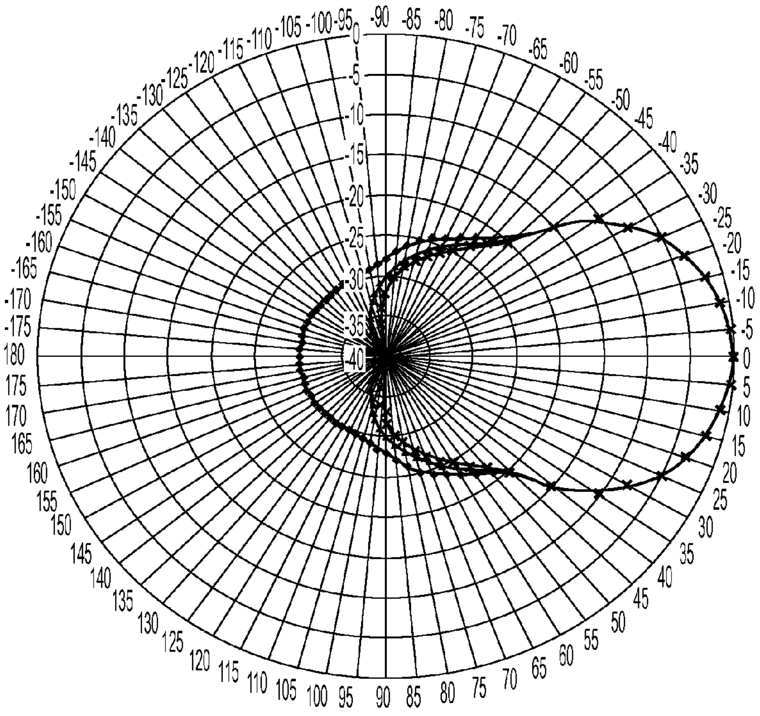
FIGS. 3A and 3B depict horizontal and vertical radiation patterns for a phased-array antenna, in accordance with embodiments of the present invention.

FIG. 3A depicts a horizontal radiation pattern for a single sector 16 using radiators configured to realize a 32 degree beam width, in accordance with an embodiment of the present invention. The phased-array antenna 14 has a fixed radiation pattern with asymmetric coefficients for null filling and efficient upper lobe suppression, created by a number of dipole radiators located in arrays within the respective sectors 16. In one embodiment, each antenna panel 18 includes two adjacent, vertically-oriented, staggered columns of eight dipole radiators. For a sector 16 that includes eight of these antenna panels 18, two vertical arrays of 64 dipole radiators each are thus provided. In this embodiment, the dipole radiators in each column are constantly-spaced at approximately one-wavelength intervals, while the columns are offset with respect to one another by approximately one-half wavelength. In other words, adjacent, staggered dipole radiators are constantly-spaced at one-half wavelength intervals.

Figure 3B:
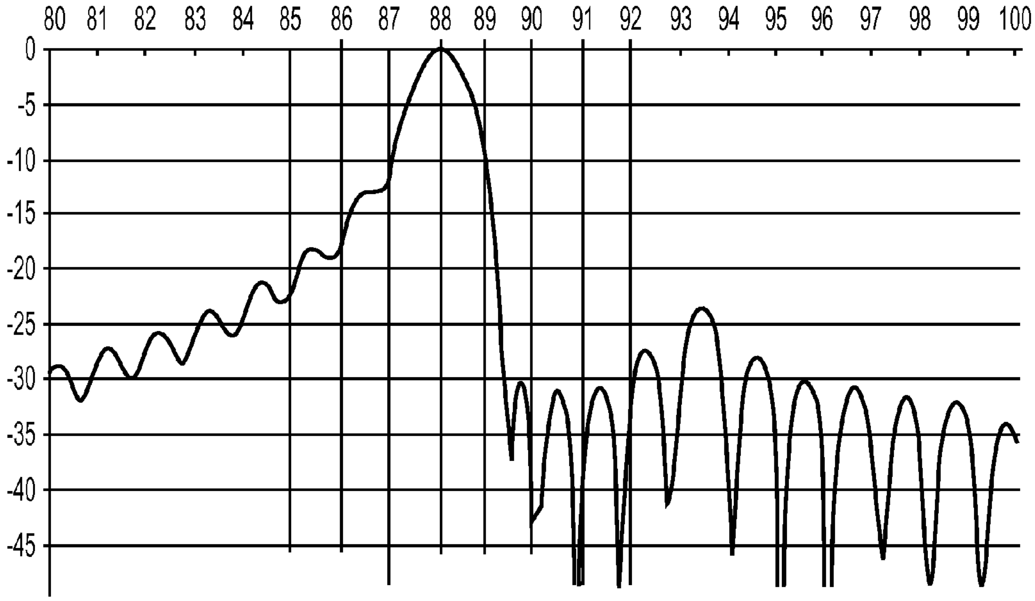

A phased-array antenna 14 according to such an embodiment can realize a signal gain factor of about 29 dBi to 32 dBi, and can accept antenna input power up to 80 W per carrier. FIG. 3B depicts the total vertical radiation pattern for a single sector, in accordance with an embodiment of the present invention.

Figure 4A:
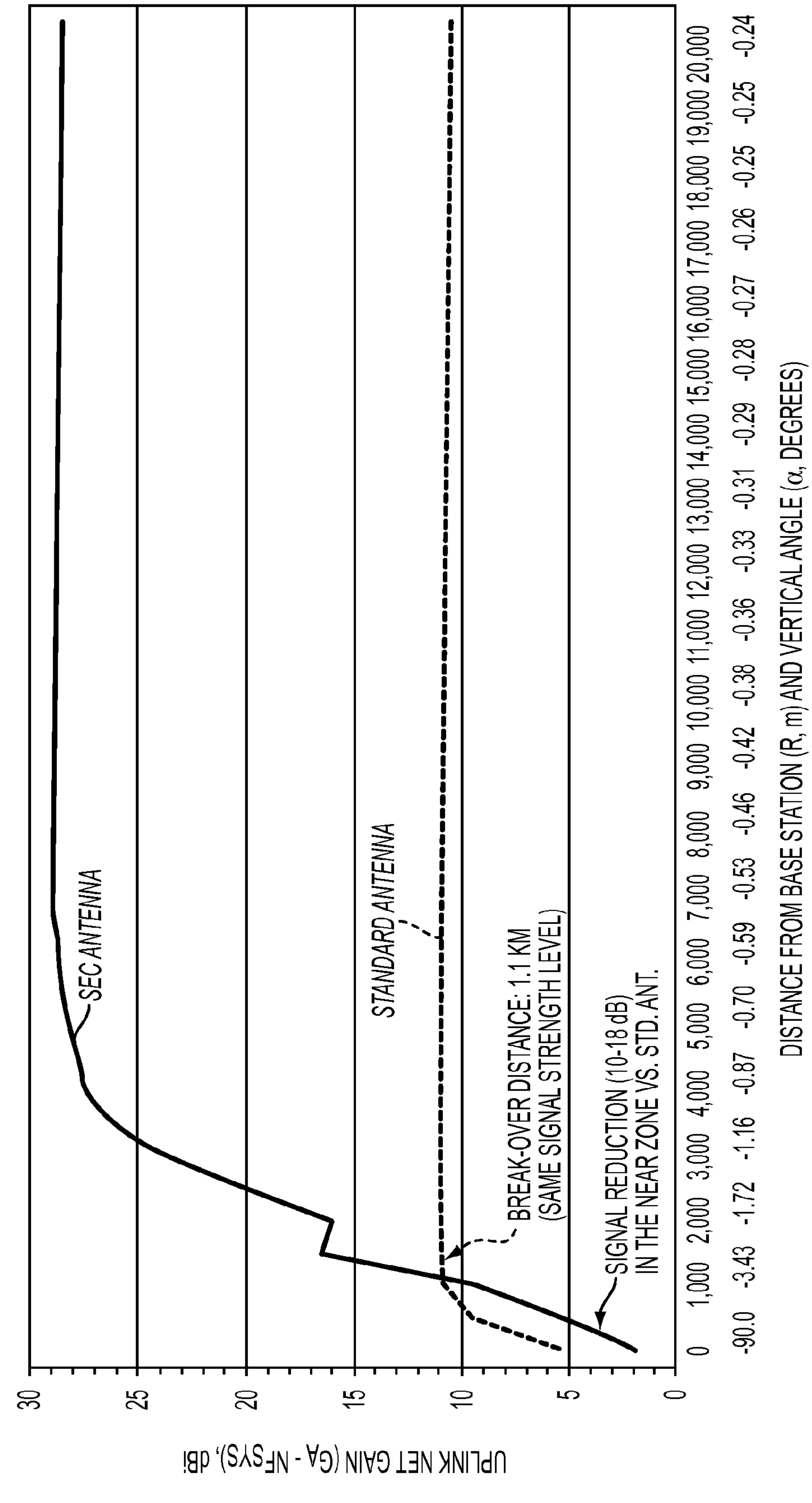
FIGS. 4A and 4B illustrate various aspects of the "Robin Hood" principle, in accordance with embodiments of the present invention.
Figure 4B:
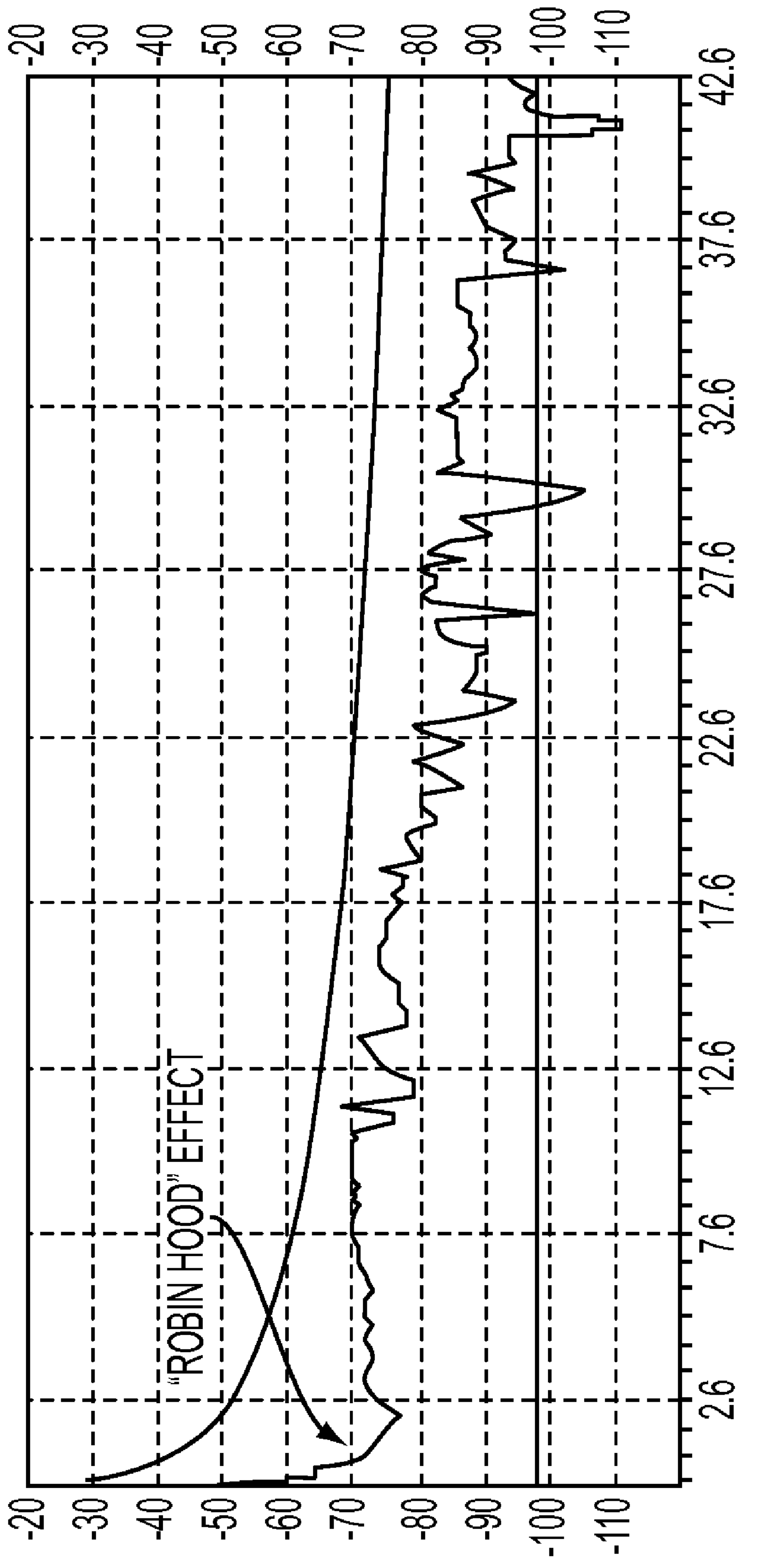

When compared to conventional cellular antennas, the phased-array antenna 14 field strength is increased by 17 dB to 27 dB in the far zone (i.e., 5 km to 30 km), decreased by about 10 dB in the near zone (i.e., 0 km to 1 km), and left unchanged in the middle zone (i.e., 1 km to 5 km). These effects produce more uniform field strength distribution patterns in the near and far zones of the phased-array antenna 14, which produces, for example, a tenfold to forty-fold increase of a cell's coverage area when compared to a conventional cellular antenna. This is an example of the "Robin Hood" principle, in which power/gain is redirected from vertical areas of surplus to vertical areas of deficiency to keep nearby power levels, and EIRP, lower while extending range, as illustrated in FIGS. 4A and 4B.

In one embodiment, every +1 dB in path loss gives 25% more signal.

The phased-array antenna 14 also supports multiple signal input and multiple signal output (MIMO) technologies, and advantageously increases the carrier/interference ratio and improves throughput due to reduced multi-path direction of arrival (DOA) speeds, optimum down tilt, and rapid cutoff of over-range radio frequency interference. Suppression of side and back lobes, which is further enhanced through abutting of panel 16 frame/reflector components and improving radiator designs, additionally increases signal reception reliability and helps to reduce the number of dropped calls in a cell.

As noted above, feed lines, such as thin, flexible coaxial cables, connect the BTS cellular operator equipment to the lower portion of the phased-array antenna 14. In one embodiment, an active low-loss device for shaping a vertical lobe's radiation pattern (e.g., LLVLSU—Low Loss Vertical Lobe Shaping Unit), an 80 W single-carrier power amplifier with a low energy density design for easy maintenance and reliability (e.g., LPDPA—Low Power Density Power Amplifier), a diplexer/filter, a combiner, a multicoupler, a low-noise amplifier (LNA), a very low noise amplifier (VLNA) and cable jumpers are included. The LLVLSU is responsible for making a cell with a phased-array antenna 14, and realizes amplitude balancing for null filling in middle and far zones, implementing the "Robin Hood" principle.

A thin, flexible coaxial cable decreases a feed line's weight, purchase cost, and wind load, eases installation, etc. Additional signal attenuation in thin, flexible coaxial cables is fully compensated by a single-carrier 80 W power amplifier in a downlink channel, installed in the lower portion of the phased-array antenna 14 directly behind the antenna panels 18. Further signal amplification is done in an uplink channel by a very low noise amplifier—one with a noise figure less than 1 dB—located likewise behind the antenna panels 16 and weather-shielded.

Diplexer/filters, combiners, and multicouplers can have respective noise figures kept to low levels in part through component quality control and in part through particular attention to matching of devices in the course of signal cascading, such as, for example, the use of the Friis cascading rule. Properly chosen and configured antenna elements can feature high electrical efficiency—that is, a voltage standing wave ratio (VSWR) that does not exceed 1.15 over a 10% passband, for example. Such a low level of VSWR can be achieved through matching of impedance of all system components, and can reduce energy losses and failure risks for high-frequency equipment of a radio BTS. Low VSWR gives numerous possibilities to fully utilize capacities of a power amplifier and a phased-array antenna 14. All active RF components are preferably designed with very low energy densities, utilizing convection air-cooling methods for additional energy efficiency and featuring system-level fault tolerance and soft-fail behavior.

In some embodiments, through use of a passive, low loss precision vertical lobe shaper (or LLVLSU), a site can redistribute its radiated power in accordance with the "Robin Hood" principle, and can ensure significant uniformity of electromagnetic field strength in near, middle, and far zones. FIG. 3B depicts a vertical radiation pattern formed by a LLVLSU. Maximum signal power is achieved at a down tilt angle of −0.5 degrees in the embodiment shown. Signal power is gradually reduced by thorough null filling (−3.125 degrees, −2.125 degrees, and −1.25 degrees), while upper lobes (>+1.25 degrees) are effectively suppressed by more than 25 dB to avoid excessive levels of RF interference.

In other embodiments, comparable "Robin Hood" field strength distribution can be achieved through passive vertical lobe shaping. In this latter form, a single passive power divider, such as a rigid power divider, may be followed by individual coaxial feeds to all panels, or the power division function may be distributed among a plurality of three-port (or more) power division devices, for example. In such embodiments, power provided to each panel may be increased or decreased relative to that to other panels to realize distribution comparable to that of LLVLSU distribution.

Figure 5:
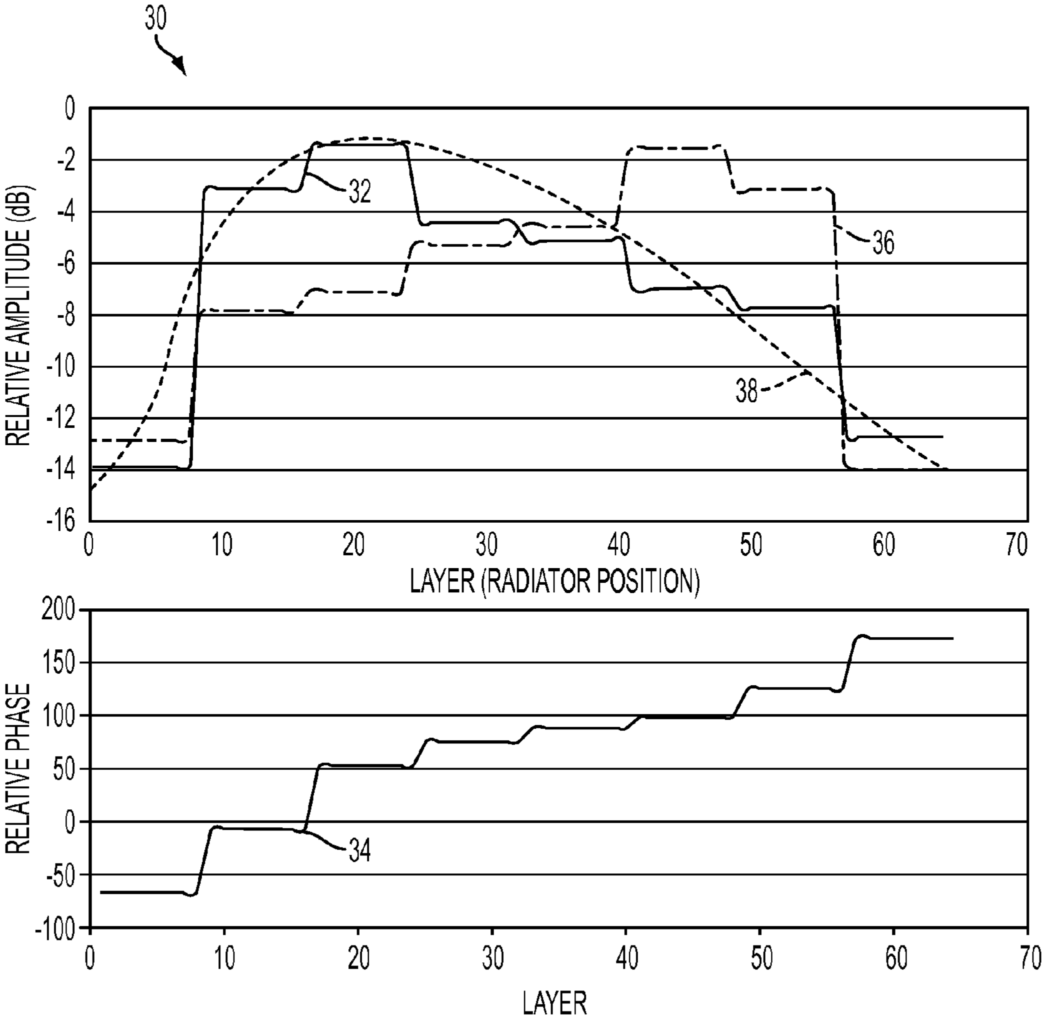
FIG. 5 illustrates antenna panel power and phase for phased-array antennas, in accordance with embodiments of the present invention.

FIG. 5 illustrates distribution spectra 30 for power 32 and phase 34 for phased-array antennas in accordance with embodiments of the present invention. In power spectra 32 and 36, each sector 16 of phased-array antenna 14 includes eight elevations 20 of individual antenna panels 18, as shown in FIG. 1. The stepwise power 32 and phase 34 distributions of FIG. 5 may be realized to any desired level of accuracy by either active or passive vertical lobe shaping. Other power and phase distribution spectra are also contemplated by the present invention. For example, FIG. 5 indicates that the maximum power level for power spectra 32 is provided to the third panel, while the maximum power level for power spectra 36 is provided to the sixth panel, etc. Still other embodiments may vary power to each radiator rather than to each panel, as shown in a third power spectra 38 of FIG. 5, in part through further variation in the signal strength coupled to each radiator within each panel 18.

Figure 6:
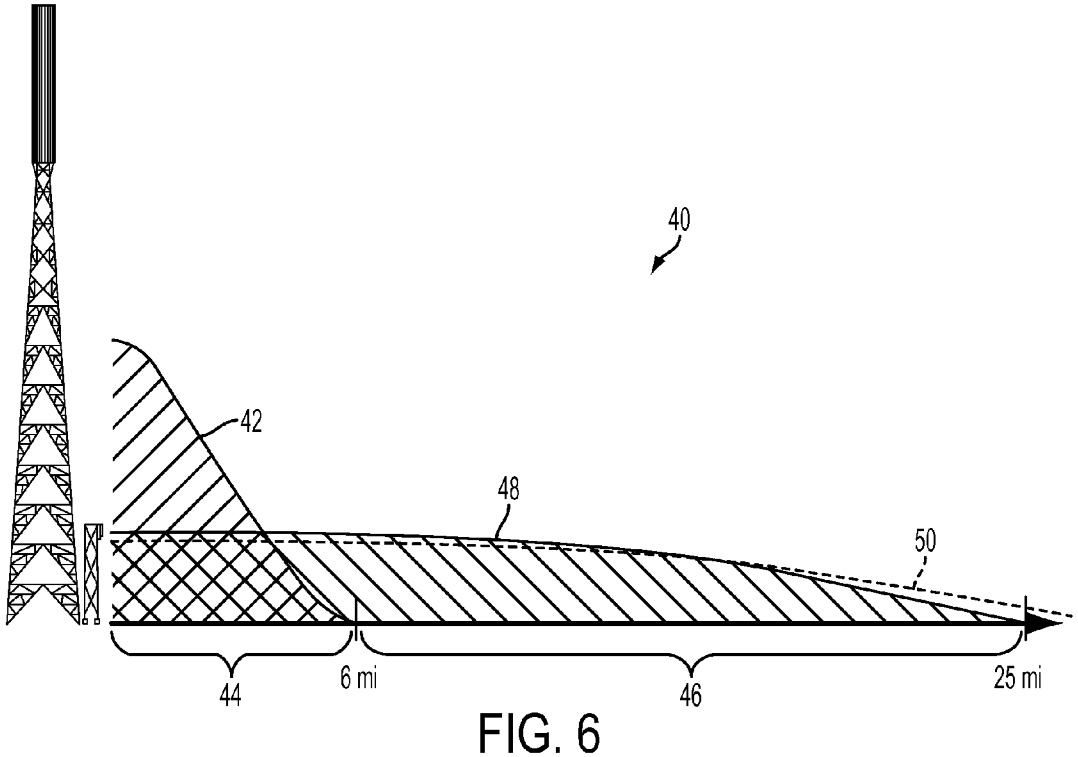
FIG. 6 presents phased-array antenna signal strength as a function of distance, in accordance with embodiments of the present invention.

FIG. 6 presents phased-array antenna signal strength 40 as a function of distance, in accordance with an embodiment of the present invention. In this embodiment, a particular power distribution 32, shown in FIG. 5, in combination with predetermined values of element spacing and phasing can provide particular values of beam tilt and downward lobe suppression. Conventional antenna designs are generally limited to realizing signal strength 42 that is much higher in the near zone 44, and much lower in the far zone 46, than a signal strength 48 distribution of an antenna embodying the present invention. Other embodiments of phased-array antennas 14, such as, for example, one wherein the exemplary panel-by-panel power distribution 32 illustrated in FIG. 5 is replaced by a power distribution 38 that is unique for each radiator in each panel 18 within a sector 16, can achieve signal strength/gain 50 that is further improved for many locations over the service area.

Figure 7A:
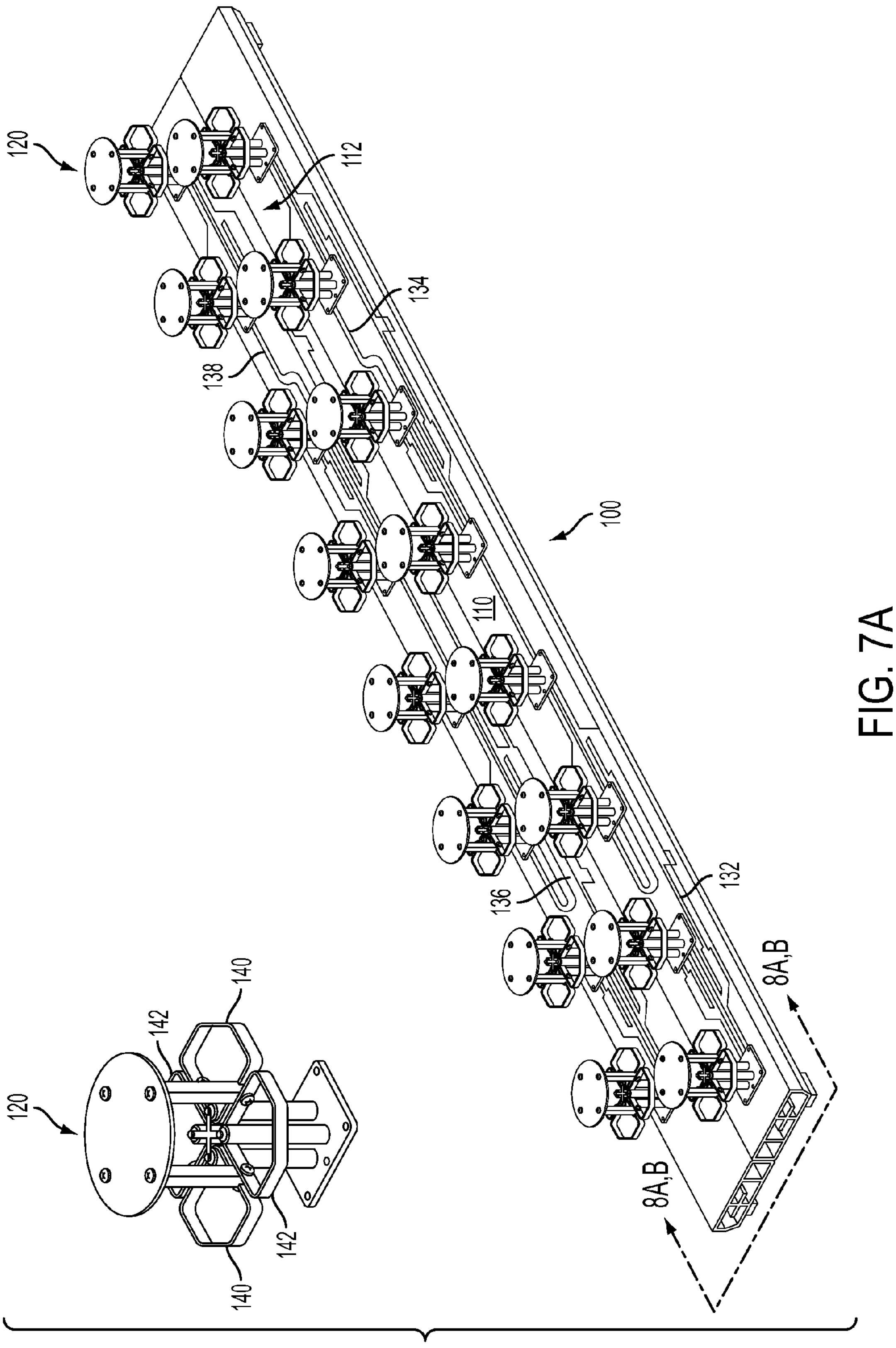
FIG. 7A depicts a perspective, semi-transparent view of a phased-array antenna panel, according to an embodiment of the present invention.
Figure 8A:
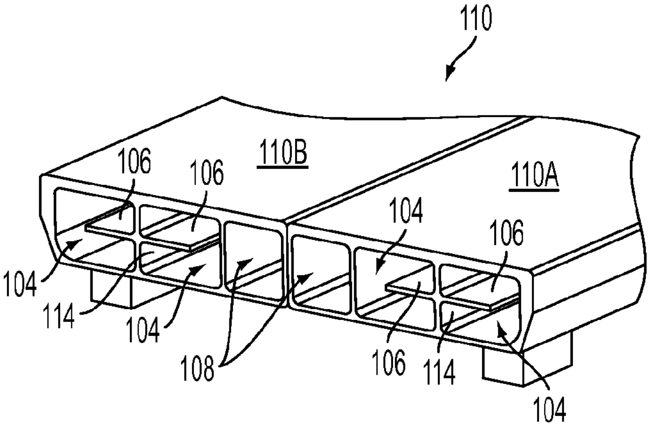
FIGS. 8A, 8B, and 8C each depict a perspective view of an end portion of a phased-array antenna panel, according to respective embodiments of the present invention.

FIGS. 7A and 8A depict a perspective, semi-transparent view of a phased-array antenna panel 100, according to an embodiment of the present invention. In a preferred embodiment, support member 110 advantageously provides a continuous reflector face 112 (or backplane) for a number of crossed dipole radiators 120, which are arranged in parallel columns on the support member 110. A number of striplines are provided within support member 110 to connect the crossed dipole radiators 120 to signal distribution cables and couplings disposed behind the support members 110 of phased-array antenna 14, shown in FIG. 1. In the depicted embodiment, two columns, each including eight crossed dipole radiators 120, are provided on each panel 100, and four striplines 132, 134, 136, 138, arranged in complementary pairs, connect the crossed dipole radiators 120 to the signal distribution cables. Each crossed dipole radiator includes two conductors, one for each dipole radiator.

In a preferred embodiment, the radiators 120 are transverse, quadrilateral, crossed-dipole radiators. A perspective view of an exemplary transverse, quadrilateral, crossed-dipole radiator 120 is also provided in FIG. 7A, whereof salient characteristics are described, in more detail, in one or more related copending patent applications. Transverse quadrilateral crossed dipole radiators 120 can be configured to exhibit low cross coupling, and, when suitably positioned and oriented, and fed with suitably phased signals, to exhibit low mutual coupling.

In the embodiment in FIG. 7A, eight equally-spaced dipole radiators 120 are provided in each of two staggered columns. The effective vertical spacing of successive radiators 120, alternating between the columns, is preferably offset by half, providing roughly half-wave spacing between radiator 120 centers in the embodiment shown. As addressed in a related copending application, the effective transmit and receive characteristics of the antenna are affected both by radiator-to-radiator spacing and by feed line phasing. A line through the centers of proximal radiators 120 in alternating columns forms a 45 degree angle with respect to a centerline of support member 110. Other numbers of equally-spaced dipole radiators 120 in each column, such as two, four, six, twelve, sixteen, etc., are also contemplated by the present invention.

In a preferred 900 MHz band embodiment, the radiators 120 within each column are separated, along the length of the antenna panel 100, by approximately 12 inches (e.g., 12.033 inches), and are offset with respect to the radiators within the adjacent column, along the length of the antenna panel 100, by approximately 6 inches (e.g., 6.017 inches). In this embodiment, the columns are separated by approximately 7½ inches (7.680 inches). In a preferred 1800 MHz band embodiment, the dimensions are all reduced by a factor of 0.5; other embodiments may be similarly accommodated. It is noted that the signals actually radiated and received by the inventive system are greater than, less than or equal to these center frequencies. For example, one 900 MHz band embodiment may include a range of frequencies for base station reception, e.g., 890-915 MHz, and a range of frequencies for base station transmission, e.g., 935-960 MHz.

In one embodiment, support member 110 is extruded from a high-strength material, such as an alloy of aluminum, and several cavities, extending longitudinally, are formed therein. Other fabrication methods and materials may be used to form support member 110, such as, for example, cold rolling, welding, etc. In the embodiment shown, support member 110 includes four (4) signal ground cavities 104, in which respective striplines 132, 134, 136, 138 are disposed. Support member 110 may also include one or more structural cavities 108, in order to provide additional lateral dimension, strength, etc.

Figure 7B:
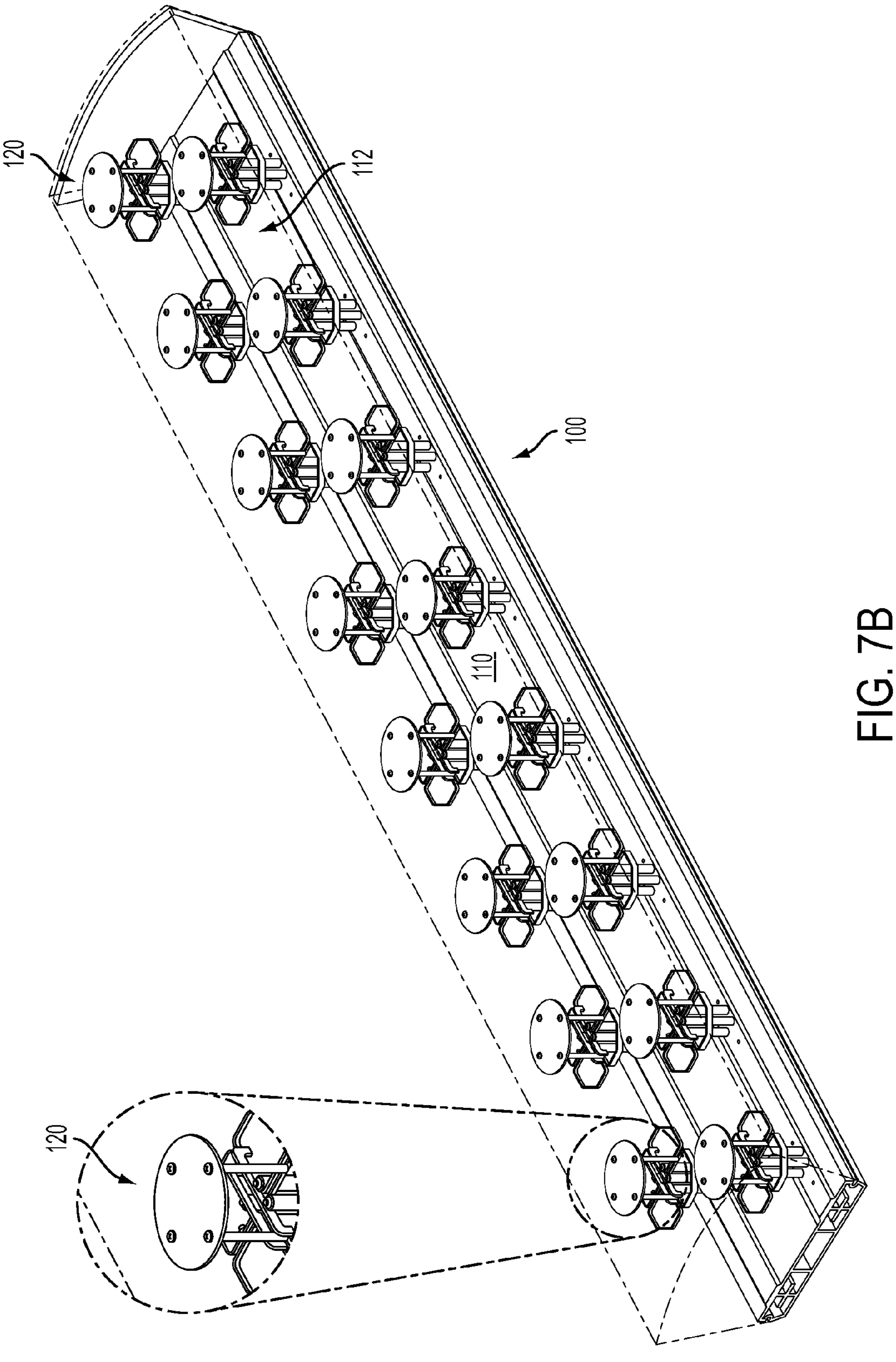
FIGS. 7B and 7C each depict a perspective view of a phased-array antenna panel, according to respective embodiments of the present invention.
Figure 8B:
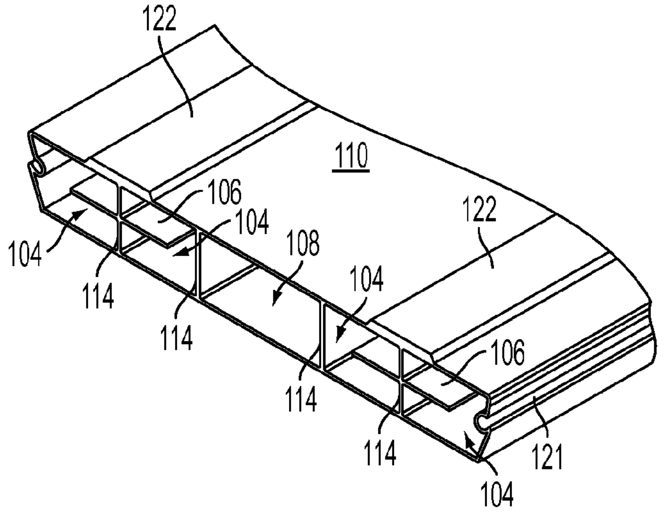

Another embodiment of antenna panel 100 is depicted in FIGS. 7B and 8B. In this embodiment, raised sections 122 are formed on support member 110 to provide additional support for dipole radiators 120. The frequency range supported by this embodiment may be, for example, the 900 MHz band.

In this embodiment, array panel 100 has an overall length of approximately 100 inches (e.g., 98.00 inches), an overall width of 12 inches (e.g., 12.60 inches) and an overall height of 2 inches (e.g., 1.91 inches). Generally, the array panel 100 has a thickness of approximately 0.1 inches (e.g., 0.08 inches), including the perimeter of the panel as well as the center webs 114 and cross members 106. The raised sections 122 are elevated above the support member 110 by approximately 0.2 inches (e.g., 0.17 inches) and offset by approximately 4 inches (e.g., 3.84 inches) from the centerline of the support member 110. Two outer center webs 114 are respectively disposed under the centerline of each raised section 122, while two inboard center webs 114 are respectively disposed between the centerline of the array panel 100 and the centerlines of the raised sections 122. Four, generally-rectangular signal ground cavities 104 are thereby formed, each enclosing approximately the same volume. For example, the two inner signal ground cavities may be approximately 2 inches in width, and ½ inches in height (e.g., 2.06 inches by 1.58 inches), while the two outer signal ground cavities 104 may be approximately 2¼ inches in width and ½ inches in height (e.g., 2.29 inches by 1.58 inches).

As shown in FIG. 8B, a circular groove 121 is formed in each side of support member 110 to receive a mating circular flange from a radome installed over the panel (shown as a dashed line in FIG. 7B). The radome may be constructed from an RF-transparent material suitable for a radome, such as, for example, polycarbonate. In this embodiment, groove 121 may have a radius of approximately ¼ inches (e.g., 0.22 inches). The radome includes two end caps and a center portion, the outer surface having a curved shape and a maximum height above the support member 110 of approximately 8 inches (e.g., 7.75 inches). Countersunk holes (not shown), of approximately ½ inch diameter, are provided in the raised sections 122 to accommodate the installation of each radiator 120. The two inner conductors of each radiator 120 pass through the holes in the raised section 122 and connect to a respective stripline disposed within the ground signal cavity 104 below.

Figure 7C:
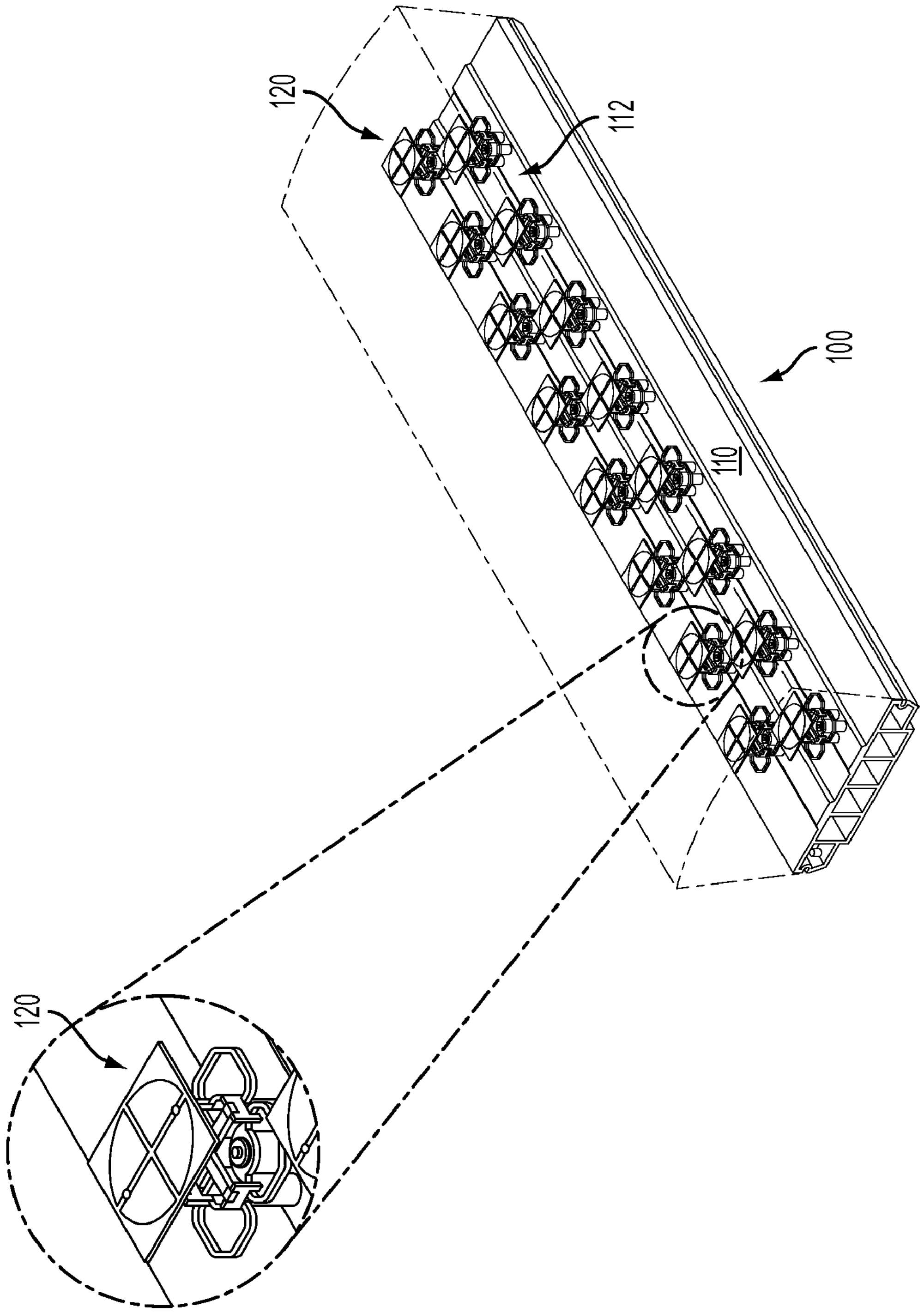
Figure 8C:
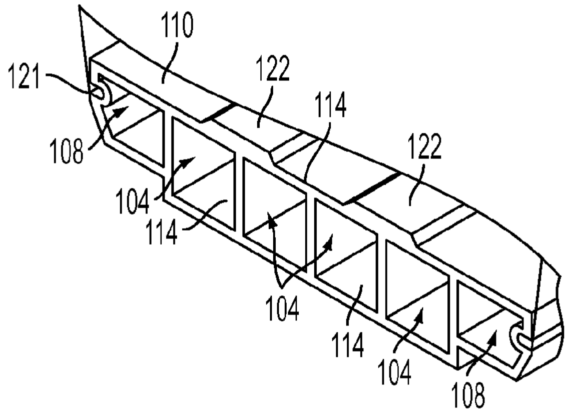

Another embodiment of antenna panel 100 is depicted in FIGS. 7C and 8C. In this embodiment, raised sections 122 are formed on support member 110 to provide additional support for dipole radiators 120. The frequency range supported by this embodiment may be, for example, the 1800 MHz band. In this embodiment, array panel 100 has an overall length of approximately 50 inches, an overall width of 12 inches and an overall height of 2 inches. Generally, the array panel 100 has a thickness of approximately 0.1 inches, including the perimeter of the panel as well as the center webs 114; no cross members are used in this embodiment. As shown in FIG. 8C, a circular groove 121 is formed in each side of support member 110 to receive a mating circular flange from a radome installed over the panel (shown as a dashed line in FIG. 7C). The radome may be constructed from an RF-transparent material suitable for a radome, such as, for example, polycarbonate. In this embodiment, groove 121 may have a radius of approximately ¼ inches. The radome includes two end caps and a center portion, the outer surface having a curved shape.

Figure 9:
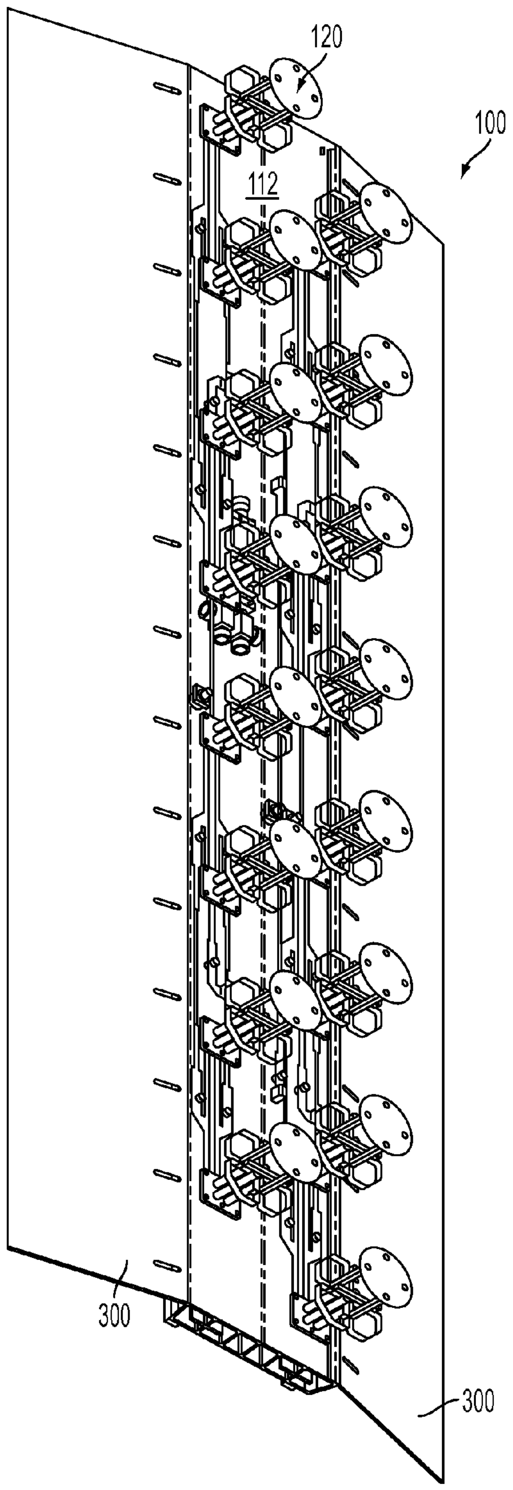
FIG. 9 depicts a perspective front view of a phased-array antenna panel, in accordance with an embodiment of the present invention.
Figure 10:
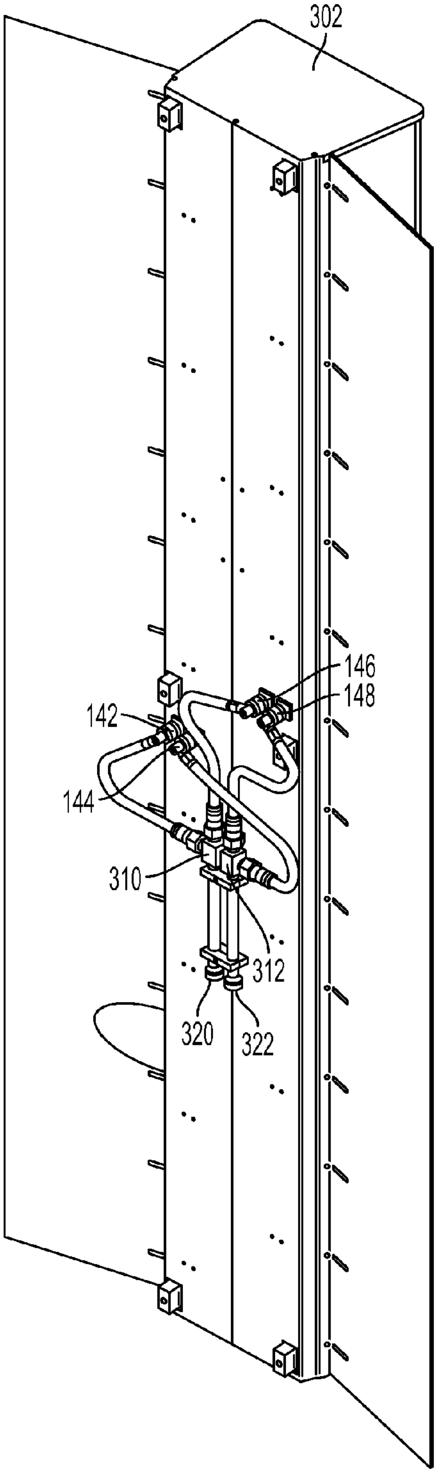
FIG. 10 depicts a perspective rear view of a phased-array antenna panel, in accordance with an embodiment of the present invention.
Figure 11A:
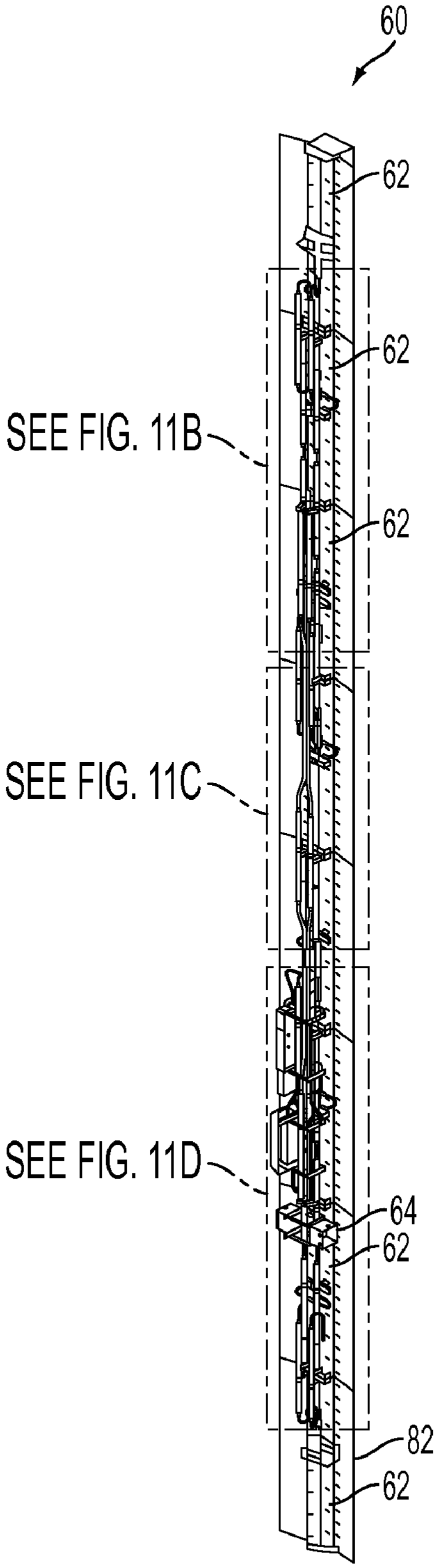
FIG. 11 depicts a perspective view of an antenna panel stack, in accordance with an embodiment of the present invention.
Figure 11B:
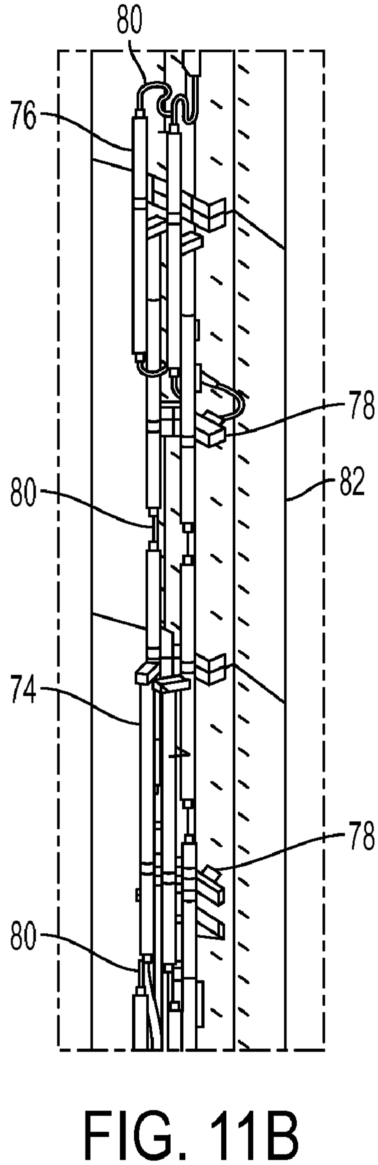
Figure 11C:
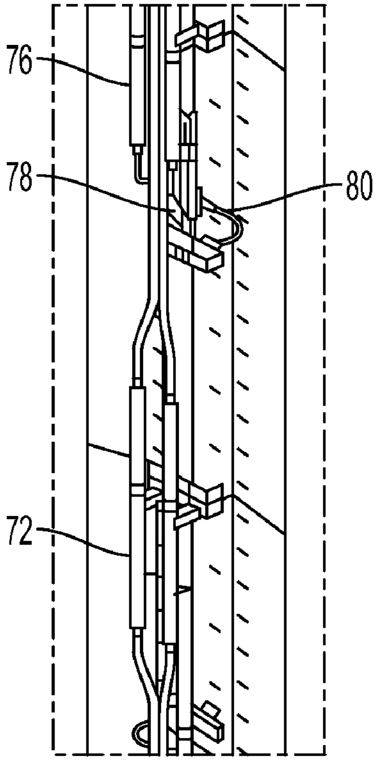
Figure 11D:
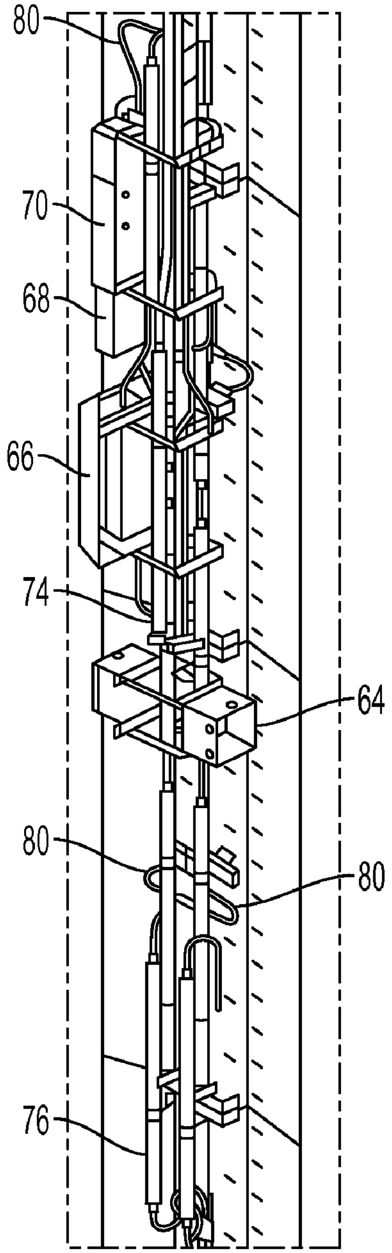

FIG. 9 depicts a perspective front view of a phased-array antenna panel, in accordance with an embodiment of the present invention, while FIG. 10 depicts a perspective rear view of a phased-array antenna panel, in accordance with an embodiment of the present invention.

Signal distribution cable connectors 142, 144, 146, 148 are coupled to signal splitters 310, 312, which divide the respective signals carried by signal feed lines 320, 322. In the embodiment depicted in FIG. 10, the signal(s) carried by signal feed line 320 are split by signal splitter 310, and then provided to signal distribution cable connectors 142, 146, while the signal(s) carried by signal feed line 322 are split, by signal splitter 312, and then provided to signal distribution cable connectors 144 and 148. In this embodiment, each dipole radiator is advantageously coupled to both signal feed lines 320, 322. In a preferred embodiment, signal splitters 310, 312 divide the respective signals carried by signal feed lines 320, 322 into orthogonal components.

Radome 302 is substantially transparent to the frequencies of interest, and encloses antenna panel 100 in order to protect dipole radiators 120 against the adverse effects of weather, etc. In one embodiment, a single sector 16 may be employed, and additional backplane surfaces 300 may be attached to each side of antenna panel 100.

FIG. 11 shows a single panel stack 60, corresponding, in the embodiment shown in FIG. 1, to a sector 16, as viewed from inside the phased-array antenna 14. The stack 60 includes a plurality of radiator panels 62, a pair of junction boxes 64, a pair of (transmitting) power amplifiers (PAs) 66, a pair of receiving amplifiers (RAs) 68, a pair of diplexer/filters 70, a pair of first tee junction/power divider assemblies 72, a plurality of second tee junction/power divider assemblies 74, a plurality of third tee junction/power divider assemblies 76, a plurality of final power dividers 78, and a plurality of interconnecting cables 80. FIG. 11 shows an embodiment that includes auxiliary reflective extension surfaces 82 to either side of the panels 62; in other embodiments, additional panels 62 forming sectors 16 to either side may obviate the extensions 82.

The arrangement of tees 72, 74, 76, 78 interconnected by cables 80 provides transmitter 66 signal output distribution and receiver 68 signal input collection by way of filter/diplexers 70. Transmission is addressed expressly in the following discussion; receive functionality mirrors transmission. Each tee 72 divides the diplexed transmit signal between two outputs, connected by cables 80 to the inputs of the next two tees 74, which further divide the signal and pass it via further cables 80 to the final four tees 76 in each string. The tees 72, 74, 76 in at least some embodiments can exhibit substantially identical propagation timing characteristics, but may differ in the amount of power delivered from the input to each output.

The proportions of signal distribution 30 shown in the chart of FIG. 5 are achieved in the embodiment shown using two values of power splitting, specifically approximating 60:40 and 70:30 splitting, over the three tiers of tees 72, 74, 76. The value of signal strength for transmitting or gain for receiving associated with each panel is the product of the power splits to a good approximation. For example, if each of the successive tees feeding a panel has a 30% branch, and the 30% branches are concatenated to feed that panel, then the proportion of transmitter energy reaching that panel is 0.3*0.3*0.3, or 2.7%. Similarly, a 70%, 60%, 60% concatenation provides 25.2% of the available power to a panel.

Tees that are all split equally (50:50) provide substantially uniform power distribution, with relatively basic beam formation. In the alternative, an extensive variety of distributions 30 can be realized by allowing each of the seven tees 72, 74, 76 to have a power split optimized for one position within the panel stack 60, rather than the combination of 70:30 and 60:40 splits in the embodiment shown. Power distribution between multiple radiators has been noted as a factor in controlling signal strength 40 at each distance from an antenna, as shown in FIG. 6. Selection of particular internal construction for each tee can provide a realization for such power distribution. Judicious compromise may permit product simplification and concomitant reduction in system cost while approaching specific performance goals to any preferred degree.

Phasing between stacked panels 62 can be made independent of power distribution to a significant extent by normalizing tee 72, 74, 76 phase as noted and using relative cable 80 length to control propagation delay. In the embodiment shown, phase is made substantially uniform by equalizing propagation delays throughout with equal-length cables 80; in other embodiments, phase adjustment along with power distribution can provide further control of beam characteristics over the cell, such as by further reducing rear and side lobes, further adjusting beam tilt and principal beam shape, and the like.

The combination of power distribution and phasing may be further varied from sector 16 to sector 16 within a phased-array antenna 14, shown in FIG. 1, in order to compensate for factors such as terrain variation, limits to coverage permitted to a particular antenna 10 by political boundaries, and the like. Thus, an antenna 14 on a dedicated tower 16 located in profoundly flat terrain over consistently conductive soil (a reliable ground plane) may support a maximally-sized cell with uniform feed to all sectors 16, for example. As an alternative example, a building-topping radiator antenna 14 may be sited near a lake with a stony bluff beyond in one direction and gently rising forest opposite thereto, and may be required to service a cell of nonuniform perimeter, requiring that power/ phase distribution in each stack 60 be tailored to azimuth-dependent characteristics of the cell.

The modified quadrilateral construction of the radiator dipoles 140, 142 and their spacing further provides low voltage standing wave ratio (VSWR) over at least a bandwidth required for cellular telephony, namely about 7.6% for the basic 900 MHz GSM band, or up to 9.1% for the P-, E-, or R-extended versions of that band. For the 1.8 GHz GSM band, bandwidth is again about 9.1%, with the gap between transmit and receive frequencies roughly equal to that of the E-GSM band.

A preferred embodiment of the inventive super economical broadcast system has an antenna gain of 30 dBi, a feeder line loss of 15 dB (0.25" line, 200 m mast (960<Hz), a gain of 30 dB, due to the active components described above, feeding down to the standard BTS that has a noise factor of 3.5 dB. Using a cascaded Friis formula, the NFsys at the antenna port is <1.0 dB. Accordingly, Ga-NF sys=30.0−1.0=29.0 dBi (in uplink). Downlink transmitter power varies between 0.1 and 80 W. With feeder lines, duplex filter and jumper cables totaling −15.0 dB, the Pa input power to antenna is 80 W, such that the EIRP is 80 W*1000=80,000 W.

Compared to the known antenna installation discussed in the Background section above, the improvement in uplink is 20.9-11.0=18.0 dB, while the improvement in downlink is 30.0-15.5+10 log 80/16=14.5+7=21.5 dB. The EIRP improves by a factor of 141.

While the EIRP calculation assumes nominal antenna gain, the actual gain provided by the inventive super economical broadcast system is developed at a distance greater than 5,000 m, and at a height above ground corresponding to the vertical lobe maximum. Closer to the base station, the full gain has not developed and the gain at the height of vertical lobe maximum is lower than a standard antenna. Additionally, the gain pointing to ground level is further reduced due to the narrow lobe. In this way, the inventive Robin Hood principle delivers lower radiated EIRP in the near zone.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to that fall within the scope of the invention.

What is claimed is:

1. A cellular communication system, comprising:

a plurality of base transceiver stations defining a plurality of respective cells, each base transceiver station including a phased-array antenna having a plurality of sectors, each sector having a plurality of vertically-arranged antenna panels, each antenna panel having a plurality of vertically-arranged radiators disposed in at least two staggered columns, wherein the vertical spacing between the radiators within each column is a predetermined value, and the vertical spacing between two adjacent radiators, one from each column, is one-half of the predetermined value.

2. The system of claim 1, wherein each column includes at least eight constantly-spaced, transverse quadrilateral crossed dipole radiators.

3. The system of claim 2, wherein the vertical spacing between the radiators within each column is approximately one wavelength.

4. The system of claim 3, wherein the vertical spacing between two adjacent radiators, one from each column, is approximately one-half wavelength.

5. The system of claim 4, wherein a line drawn between the center of two adjacent radiators, one from each column, forms about a 45 degree angle with respect to a centerline of the antenna panel.

6. The system of claim 2, wherein the plurality of sectors includes at least six sectors.

7. The system of claim 6, wherein each sector includes at least eight antenna panels.

8. The system of claim 7, wherein each sector forms a directional antenna beam having a horizontal beam width of approximately 7° to approximately 65°, and a vertical beam width of approximately 0.66° to approximately 2°.

9. The system of claim 8, wherein each sector forms a directional antenna beam having a horizontal beam width of approximately 30° to approximately 45°.

10. The system of claim 1, wherein the phased-array antenna broadcasts a signal that has a near zone field strength, a middle zone field strength and a far zone field strength, and wherein the near zone is located approximately 0 km to 1 km, the middle zone is located approximately 1 km to 5 km, and the far zone is located approximately 5 km to 30 km.

11. The system of claim 10, wherein the phased-array antenna near zone field strength is approximately 10 dB less than a conventional cellular antenna field strength, and the phased-array antenna far zone field strength is approximately 17 dB to 27 dB greater than the conventional cellular antenna field strength.

12. The system of claim 10, wherein each sector includes a passive feed system that distributes a predetermined signal power and a predetermined signal phase to and from each antenna panel.

13. The system of claim 10, wherein each antenna panel includes a passive feed system that distributes a predetermined signal power and a predetermined signal phase to and from each antenna radiator.

14. The system of claim 13, wherein the passive feed system is a stripline.

15. A method for broadcasting signals using a phased-array antenna, comprising:

forming a horizontally and vertically shaped beam using a plurality of vertically-arranged antenna panels, each antenna panel having a plurality of vertically-arranged radiators disposed in at least two staggered columns; and transmitting a power distribution that has an essentially uniform field strength over a near zone, a middle zone and at least a portion of a far zone, wherein the vertical spacing between the radiators within each column is a predetermined value, and the vertical spacing between two adjacent radiators, one from each column, is one-half of the predetermined value.

16. The method of claim 15, wherein the near zone is located approximately 0 km to 1 km, the middle zone is located approximately 1 km to 5 km, and the far zone is located approximately 5 km to 30 km.

17. The method of claim 16, wherein the near zone field strength is approximately 10 dB less than a conventional cellular antenna field strength, and the far zone field strength is approximately 17 dB to 27 dB greater than the conventional cellular antenna field strength.

18. The method of claim 15, wherein the horizontal beam width is approximately 7° to approximately 65°, and the vertical beam width is approximately 0.66° to approximately 2°.

19. The method of claim 15, wherein each column includes at least eight constantly-spaced, transverse quadrilateral crossed dipole radiators, wherein the vertical spacing between the radiators within each column is approximately one wavelength, and wherein the vertical spacing between two adjacent radiators, one from each column, is approximately one-half wavelength.

20. A system for broadcasting signals using a phased-array antenna, comprising:

means for forming a horizontally and vertically shaped beam; and means for transmitting a power distribution that has an essentially uniform field strength over a near zone, a middle zone and at least a portion of a far zone that includes a plurality of vertically-arranged radiators disposed in at least two staggered columns, wherein the vertical spacing between the radiators within each column is a predetermined value, and the vertical spacing between two adjacent radiators, one from each column, is one-half of the predetermined value.

* * * * *